United States Patent

Messina

Patent Number: 6,112,398
Date of Patent: Sep. 5, 2000

[54] METHOD OF MAKING A BRAKE ROTOR/ DRUM

[75] Inventor: Paul R. Messina, Vandalia, Ohio

[73] Assignee: Meritor Automotive, Inc., Troy, Mich.

[21] Appl. No.: 09/226,679

[22] Filed: Jan. 7, 1999

[51] Int. Cl.[7] .................................................. B22D 15/00
[52] U.S. Cl. ............................................ 29/527.6; 164/34
[58] Field of Search .............................. 164/34; 29/527.6

[56] References Cited

U.S. PATENT DOCUMENTS

| 5,203,398 | 4/1993 | Easwaran | 164/34 |
| 5,524,696 | 6/1996 | Osborne et al. | 164/34 |
| 5,620,042 | 4/1997 | Irm | 164/95 |

Primary Examiner—P. W. Echols
Attorney, Agent, or Firm—Carlson, Gaskey & Olds

[57] ABSTRACT

A rotatable vehicle brake component having integrally formed teeth adapted for use with a sensor of an anti-lock brake system is disclosed. The method for producing the rotatable vehicle brake component of this invention comprises the steps of: (a) providing a vaporizable pattern having a shape which generally corresponds to the desired final shape of the rotatable vehicle brake component, the rotatable vehicle brake component selected from the group consisting of a vehicle brake drum and a vehicle brake rotor, the pattern; (b) forming a mold around the pattern; (c) forming the rotatable vehicle brake component by a lost foam casting process wherein molten metal is introduced into the mold causing vaporization of the pattern, the rotatable vehicle component having integrally formed teeth; (d) removing the cast rotatable vehicle brake component from the mold; and (e) machining the integrally formed teeth of the cast rotatable vehicle brake component to predetermined tolerances to thereby produce the rotatable vehicle brake component.

5 Claims, 6 Drawing Sheets

METHOD OF MAKING A BRAKE ROTOR/DRUM

BACKGROUND OF THE INVENTION

This invention relates in general to vehicle brake assemblies and in particular to an improved structure for a brake rotor/drum for use in such a vehicle brake assembly and method for producing the same.

Most vehicles are equipped with a brake system for slowing or stopping movement of the vehicle in a controlled manner. A typical brake system includes either a disc brake assembly or a drum brake assembly for each of the wheels. The brake assemblies are typically actuated by hydraulic or pneumatic pressure generated by an operator of the vehicle depressing a foot pedal, pulling a hand lever, and the like. The structure and operation of the brake assemblies, as well as the actuators therefor, are well known in the art.

A typical disc brake assembly includes a rotor which is secured to the wheel of the vehicle for rotation therewith. The rotor includes a pair of opposed friction plates which are selectively engaged by portions of a caliper assembly. The disc brake assembly includes a caliper assembly of either a "floating" type or a "fixed" type. A floating caliper type of disc brake assembly is usually used on automobiles and light and medium duty trucks. A conventional floating caliper type of disc brake assembly includes a brake caliper which is supported by a pair of pins or on a pair of guide rails for sliding movement relative to an anchor plate which is secured to a fixed, non-rotatable component of the vehicle. A fixed caliper type of disc brake assembly is sometimes used in automobiles and light and medium duty trucks. A conventional fixed caliper type of disc brake assembly (shown generally at 114 in prior art FIG. 12), includes a brake caliper which is solidly fixed to a fixed, non-rotatable component of the vehicle. In both types of disc brake assemblies, a pair of brake shoes are supported by the disc brake assembly on opposite sides of the rotor for sliding movement relative thereto. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

A typical drum brake assembly includes a backing plate which is secured to a fixed, non-rotatable component of the vehicle, such as the vehicle axle housing. A pair of opposed arcuate brake shoes are supported on the backing plate for selective movement relative thereto. Each of the brake shoes has a friction pad secured thereto. The brake drum assembly further includes a hollow cylindrical brake drum which is secured to a vehicle wheel for rotation therewith. The hollow interior of the brake drum defines an inner cylindrical braking surface. The brake drum is disposed adjacent to the backing plate such that the brake shoes extend within the cylindrical braking surface. When the operator of the vehicle depresses the brake pedal, the brake shoes are moved outwardly apart from one another such that the friction pads frictionally engage the cylindrical braking surface of the brake drum. Such frictional engagement causes slowing or stopping of the rotational movement of the brake drum and, therefore, the wheel of the vehicle in a controlled manner.

When the above brake rotor/drum is used in a brake system having an anti-lock brake feature, the brake rotor/drum can be provided with integrally cast teeth. As shown in prior art FIG. 12, the teeth 110 provided in a brake rotor 112 of a disc brake assembly 114 (or a brake drum (not shown) of a drum brake assembly (not shown)) are "read" by an anti-lock brake sensor 116 in order to generate a signal to the anti-lock brake system. Typically, the teeth are cast in the brake rotor/drum during the casting process, and then subsequently machined to predetermined tolerances. The casting process typically used to cast the brake rotor/drum is a green sand casting process. While the use of such a casting process appears to result in generally uniform teeth, the shape of the teeth can vary due to the nature of the sand casting process. As a result, the "set up" area provided for the teeth by the sand casting process can make it difficult to machine the teeth to tight tolerances that are necessary for proper operation of the anti-lock brake system. Thus, it would be desirable to provide an improved structure for a brake rotor/drum having integrally cast teeth and method for producing such a brake rotor/drum which is relatively simple and economical.

SUMMARY OF THE INVENTION

This invention relates to a rotatable vehicle brake component having integrally formed teeth adapted for use with a sensor of an anti-lock brake system. The method for producing the rotatable vehicle brake component of this invention comprises the steps of: (a) providing a vaporizable pattern having a shape which generally corresponds to the desired final shape of the rotatable vehicle brake component, the rotatable vehicle brake component selected from the group consisting of a vehicle brake drum and a vehicle brake rotor, the pattern; (b) forming a mold around the pattern; (c) forming the rotatable vehicle brake component by a lost foam casting process wherein molten metal is introduced into the mold causing vaporization of the pattern, the rotatable vehicle component having integrally formed teeth; (d) removing the cast rotatable vehicle brake component from the mold; and (e) machining the integrally formed teeth of the cast rotatable vehicle brake component to predetermined tolerances to thereby produce the rotatable vehicle brake component.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
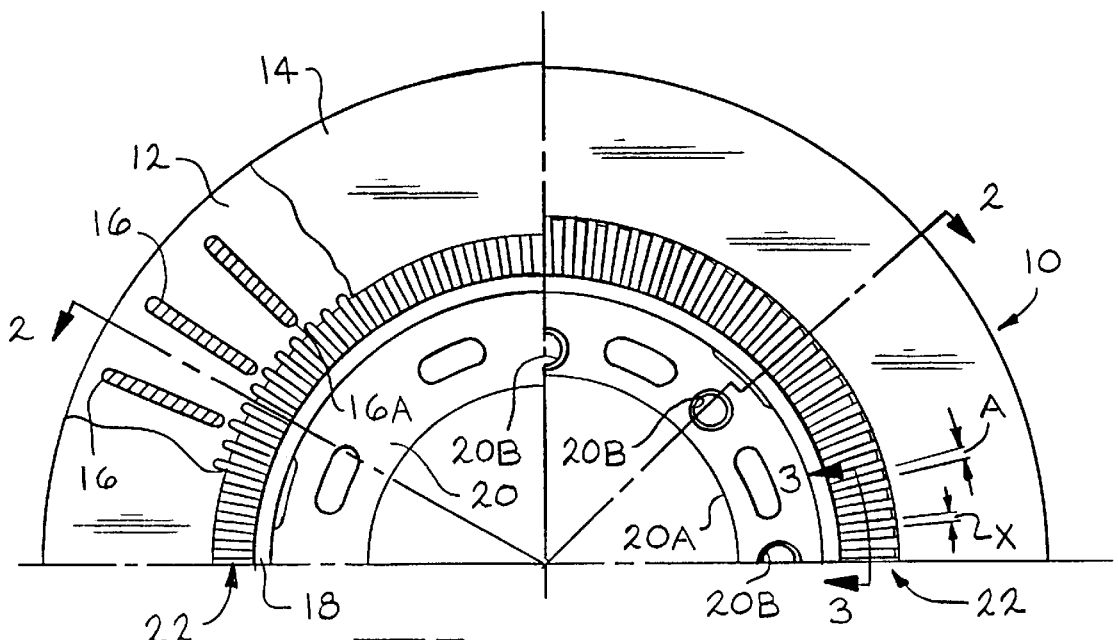
FIG. 1 is a plan view, partially broken away, of a portion of a first embodiment of a brake rotor constructed in accordance with this invention.
Figure 2:
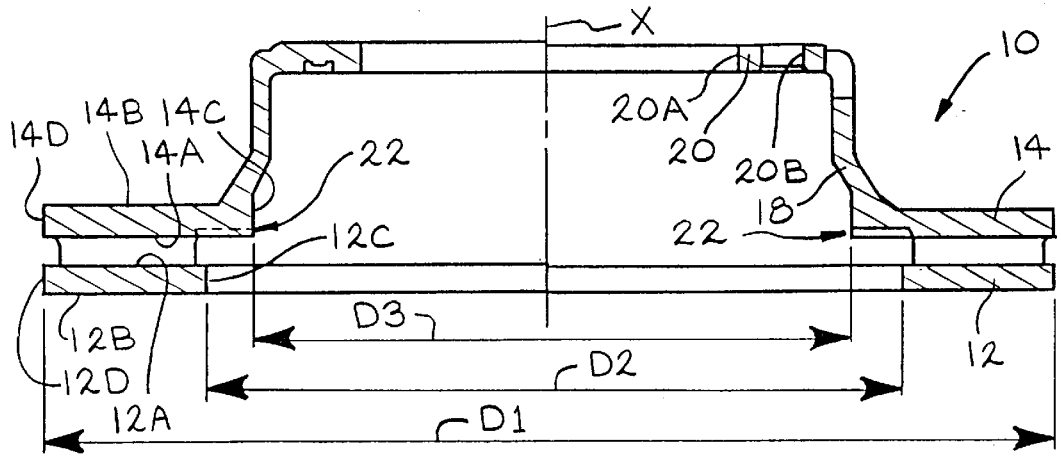
FIG. 2 is a sectional view taken along line 2—2 of FIG. 1.

Referring now to the drawings, there is illustrated in FIGS. 1 and 2 a first embodiment of a brake rotor, indicated generally at 10, in accordance with this invention. In FIG. 1, the left side of the drawing illustrates the "as cast" rotor structure, and the right side of the drawing shows the "finish machined" rotor structure. As shown in FIGS. 1 and 2, the brake rotor 10 is a ventilated full cast rotor and includes a pair of opposed friction plates 12 and 14 which are spaced apart from one another by a plurality of intermediate ribs or posts 16 in a known manner. The friction plate 14 is connected by a circumferentially extending wall 18 to an inner mounting flange portion 20. As will be discussed below, the entire rotor 10, including the two friction plates 12 and 14, the intermediate ribs 16, the wall 18, and the inner mounting flange portion 20 are cast from grey iron as a single piece during a "lost foam" casting process. Alternatively, other materials, such as aluminum or aluminum alloys, can also be used.

The inner mounting flange portion 20 of the brake rotor 10 includes a centrally located pilot hole 20A which defines an axis of rotation X for the brake rotor 10. A plurality of lug bolt receiving holes 20B (only 3 of such lug bolt receiving holes 20B are shown in FIG. 1) are equally spaced circumferentially on the brake rotor 10 about the pilot hole 20A. The pilot hole 20A and the lug bolt receiving holes 20B can be formed by any conventional machining operation after the casting operation is completed. As is known, a lug bolt (not shown) extends through each of the lug bolt receiving holes 20B for mounting and securing the brake rotor 10 to a vehicle wheel/wheel hub (not shown).

The friction plate 12 includes an inwardly facing surface 12A, an outwardly facing surface 12B, an inner peripheral edge 12C, and an outer peripheral edge 12D. Similarly, the friction plate 14 includes an inwardly facing surface 14A, an outwardly facing surface 14B, an inner peripheral edge 14C, and an outer peripheral edge 14D. The inwardly facing surfaces 12A and 14A and the outwardly facing surfaces 12B and 14B of the friction plates 12 and 14, respectively, are oriented in a generally parallel relationship relative to one another. The outer peripheral edges 12D and 14D of the friction plates 12 and 14, respectively, define an outer friction plate diameter D1 relative to the axis of rotation X. The inner peripheral edge 12C of the friction plate 12 defines a first inner friction plate diameter D2 relative to the axis of rotation X, and the inner peripheral edge 14C of the friction plate 14 defines a first inner friction plate diameter D3 relative to the axis of rotation X.

Figure 3:
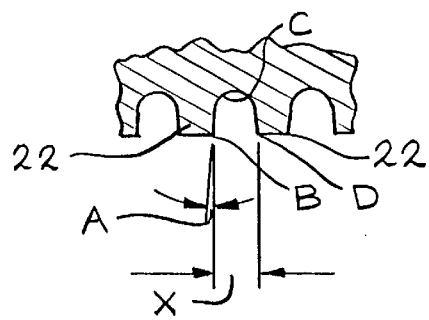
FIG. 3 is a sectional view taken along line 3—3 of FIG. 1.

The brake rotor 10 further includes a plurality of "teeth" 22. As will be discussed, the teeth 22 are integrally cast in situ with the casting of the brake rotor 10. The teeth 22 extend radially outwardly from generally adjacent the inner peripheral edge 14C of the friction plate 14 to generally adjacent an inner radius 16A of the ribs 16. As best shown in FIG. 3, each tooth 22 has a slight taper A from a point B to a point C. Also, a generally straight or uniform gap X is defined between points B and D on respective adjacent teeth 22.

Figure 4:
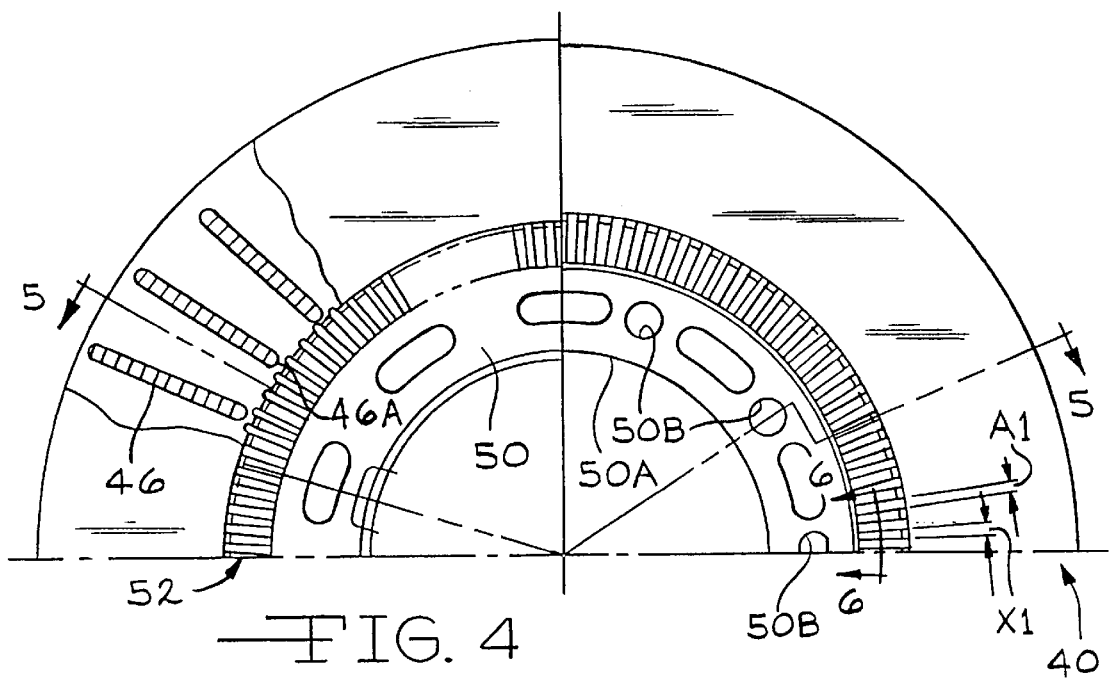
FIG. 4 is a plan view, partially broken away, of a portion of a second embodiment of a brake rotor constructed in accordance with this invention.
Figure 5:
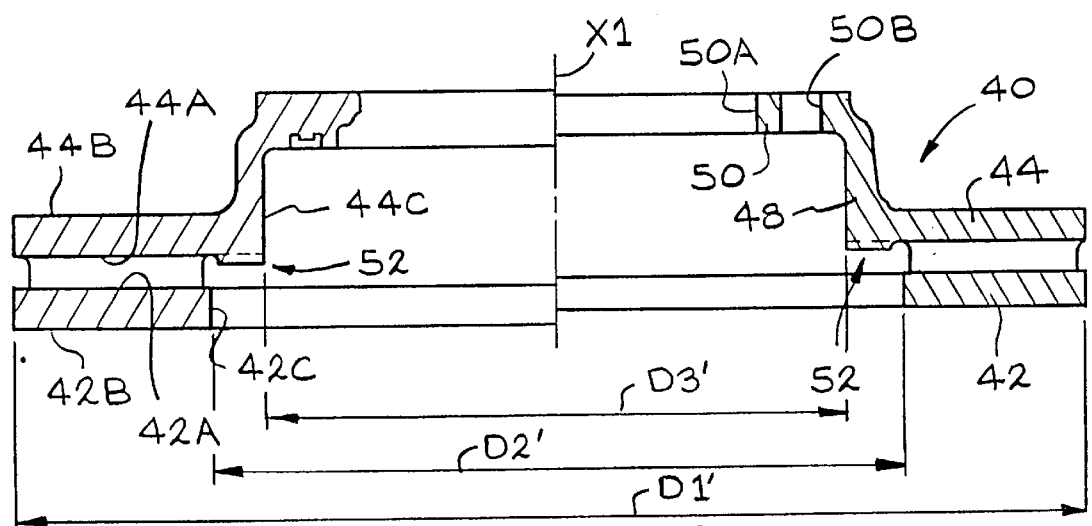
FIG. 5 is a sectional view taken along line 5—5 of FIG. 4.
Figure 6:
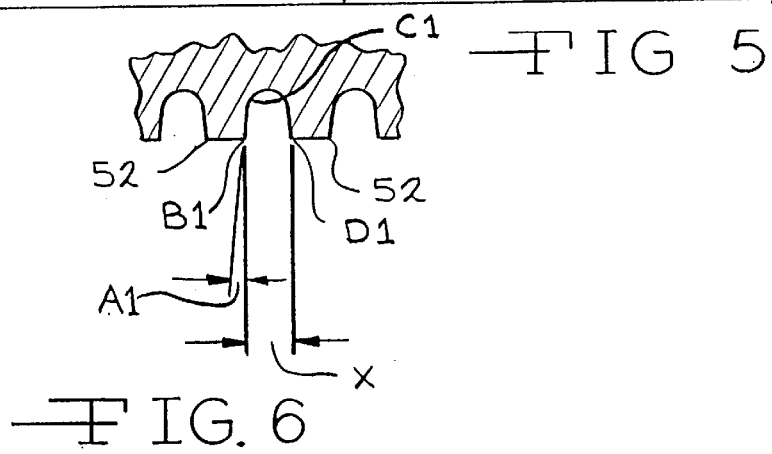
FIG. 6 is a sectional view taken along line 6—6 of FIG. 4.

FIGS. 4–6 illustrate a second embodiment of a brake rotor, indicated generally at 40, in accordance with this invention. In FIG. 4, the left side of the drawing illustrates the "as cast" rotor structure, and the right side of the drawing shows the "finish machined" rotor structure. As shown in FIGS. 4 and 5, the brake rotor 40 is a ventilated full cast rotor and includes a pair of opposed friction plates 42 and 44 which are spaced apart from one another by a plurality of intermediate ribs or posts 46 in a known manner. The friction plate 44 is connected by a circumferentially extending wall 48 to an inner mounting flange portion 50. As will be discussed below, the entire rotor 40, including the two friction plates 42 and 44, the intermediate ribs 46, the wall 48, and the inner mounting flange portion 50 are cast from grey iron as a single piece during a "lost foam" casting process. Alternatively, other materials, such as aluminum or aluminum alloys, can also be used.

The inner mounting flange portion 50 of the brake rotor 40 includes a centrally located pilot hole 50A which defines an axis of rotation X1 for the brake rotor 40. A plurality of lug bolt receiving holes 50B (only 3 of such lug bolt receiving holes 50B are shown in FIG. 4) are equally spaced circumferentially on the brake rotor 40 about the pilot hole 50A. The pilot hole 50A and the lug bolt receiving holes 50B can be formed by any conventional machining operation after the casting operation is completed. As is known, a lug bolt (not shown) extends through each of the lug bolt receiving holes 50B for mounting and securing the brake rotor 40 to a vehicle wheel (not shown).

The friction plate 42 includes an inwardly facing surface 42A, an outwardly facing surface 42B, an inner peripheral edge 42C, and an outer peripheral edge 42D. Similarly, the friction plate 44 includes an inwardly facing is surface 44A, an outwardly facing surface 44B, an inner peripheral edge 44C, and an outer peripheral edge 44D. The inwardly facing surfaces 42A and 44A and the outwardly facing surfaces 42B and 44B of the friction plates 42 and 44, respectively, are oriented in a generally parallel relationship relative to one another. The outer peripheral edges 42D and 44D of the friction plates 42 and 44, respectively, define an outer friction plate diameter D1 relative to the axis of rotation X. The inner peripheral edge 42C of the friction plate 42 defines a first inner friction plate diameter D2' relative to the axis of rotation X', and the inner peripheral edge 44C of the friction plate 44 defines a first inner friction plate diameter D3' relative to the axis of rotation X'.

The brake rotor 40 further includes a plurality of "teeth" 52. As will be discussed, the teeth 52 are integrally cast in situ with the casting of the brake rotor 40. The teeth 52 extend radially outwardly from generally adjacent the inner peripheral edge 44C of the friction plate 44 to generally adjacent an inner radius 46A of the ribs 46. As best shown in FIG. 6, each tooth 52 has a slight taper Al from a point B1 to a point C1. Also, a generally straight or uniform gap X1 is defined between points B1 and D1 on respective adjacent teeth 52.

Figure 7:
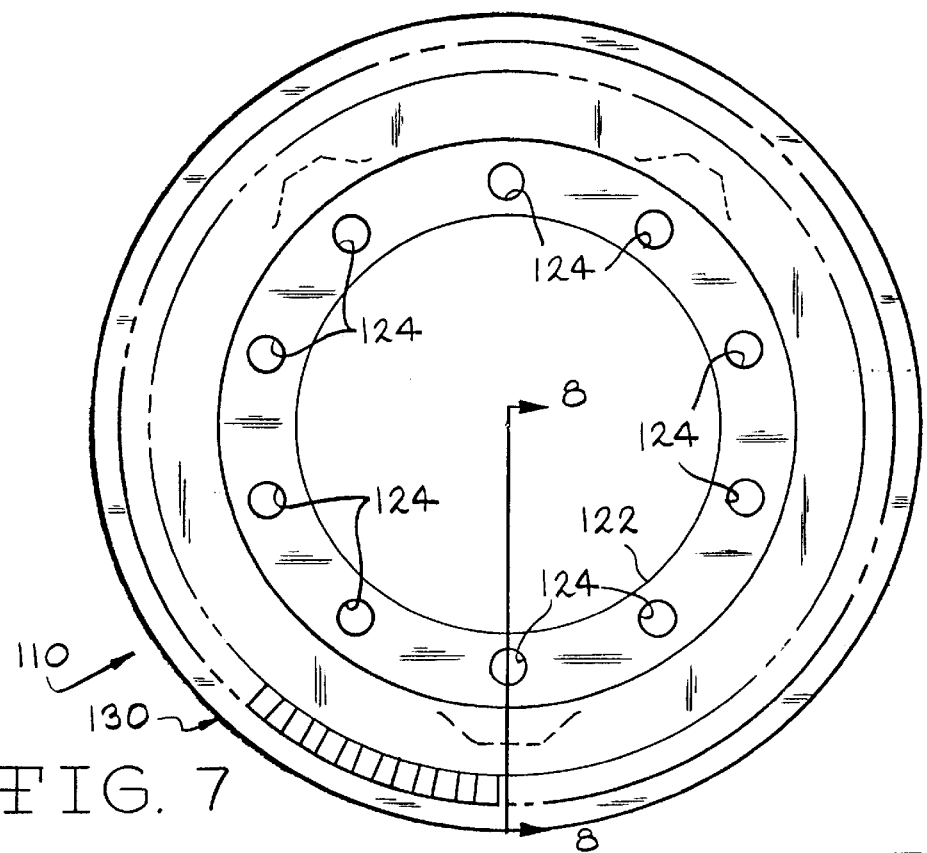
FIG. 7 is a view of a portion of a first embodiment of a brake drum constructed in accordance with this invention.
Figure 8:
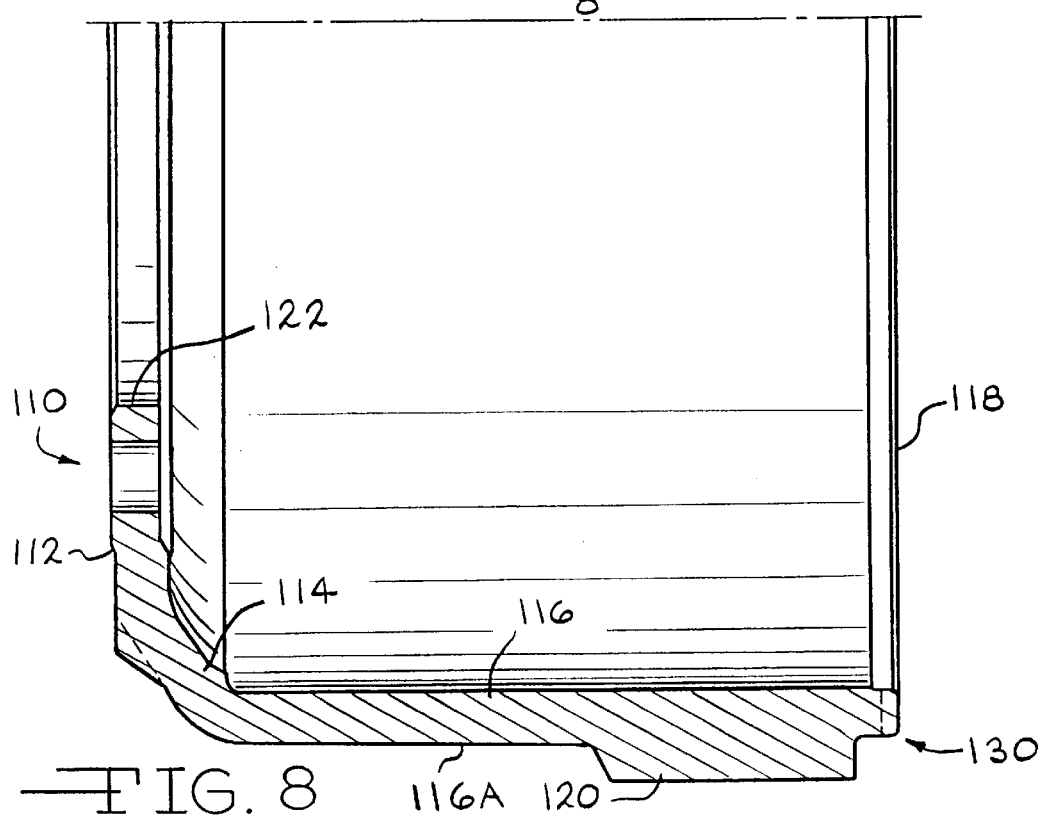
FIG. 8 is a sectional view taken along line 8—8 of FIG. 7.

FIGS. 7 and 8 illustrate a first embodiment of a brake drum, indicated generally at 110, in accordance with this invention. As shown therein, the brake drum 110 includes a generally closed end or mounting flange portion 112, a transition section 114, a generally axially extending cylindrical main body 116, and an opened end 118. The cylindrical body portion 116 defines an outer surface 116A and, in the illustrated embodiment, includes a raised continuously extending annular squealer band 120. The mounting flange portion 112 of the brake drum 110 includes a generally centrally located pilot hole 122 formed therein and a plurality of lug bolt holes 124 (ten of such lug bolt hole 124 being illustrated) spaced circumferentially around the pilot hole 122. The lug bolt mounting holes 124 are adapted to receive vehicle wheel/wheel hub mounting studs (not shown) for securing a vehicle wheel/wheel hub (not shown) to the brake drum 110 for rotation therewith.

The brake drum 110 further includes a plurality of teeth 130. The teeth 130 are integrally cast in situ with the casting of the brake drum 110. The teeth 130 are formed at the opened end 118 of the brake drum 110.

Figure 9:
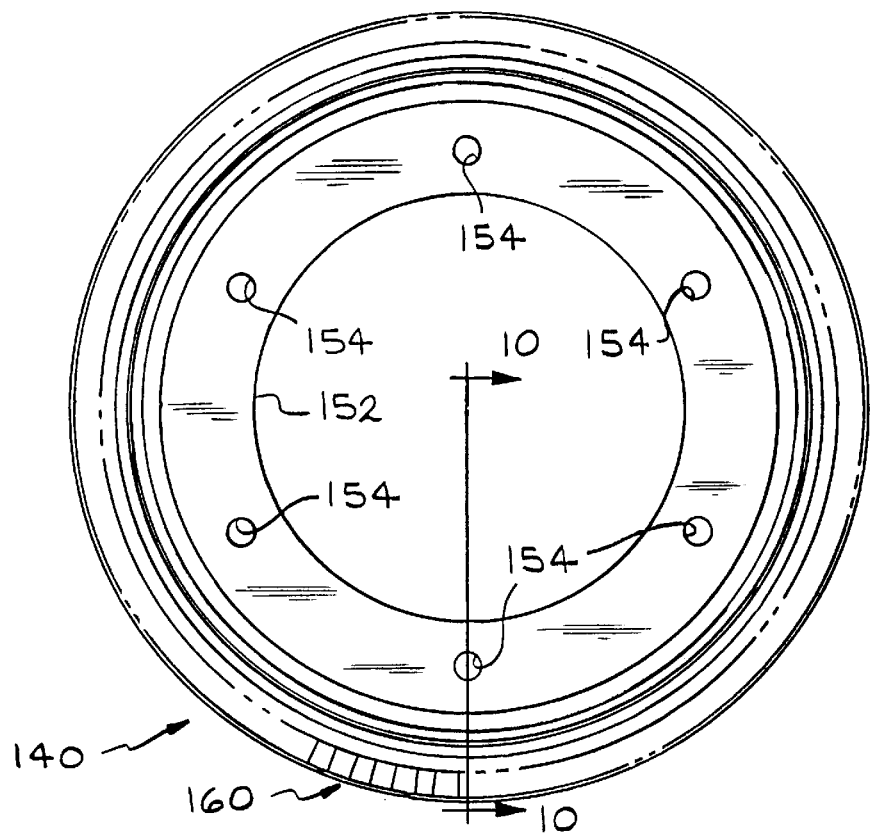
FIG. 9 is a view of a portion of a second embodiment of a brake drum constructed in accordance with this invention.
Figure 10:
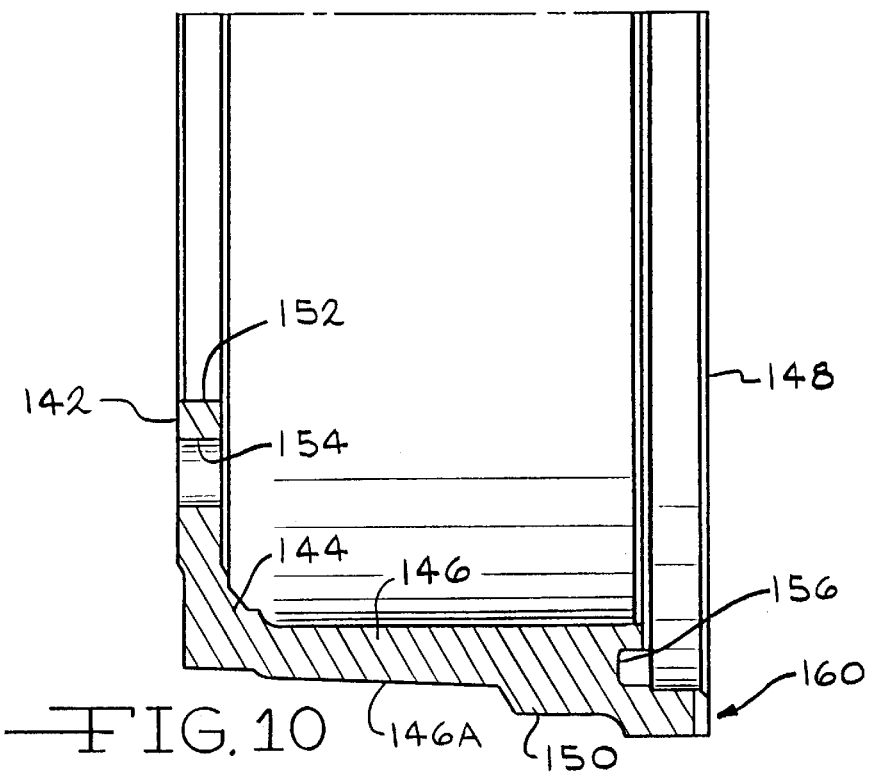
FIG. 10 is a sectional view taken along line 10—10 of FIG. 9.
Figure 11:
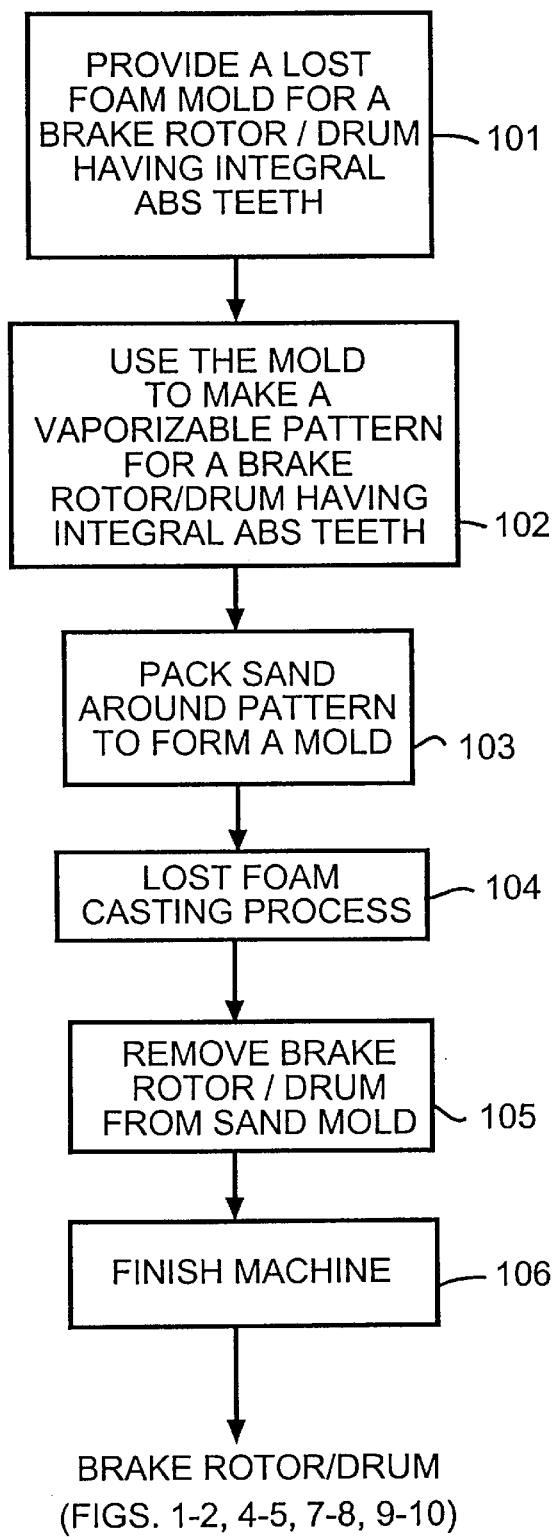
FIG. 11 is a block diagram illustrating the sequence of steps for producing the brake rotor/drum of this invention.
Figure 12:
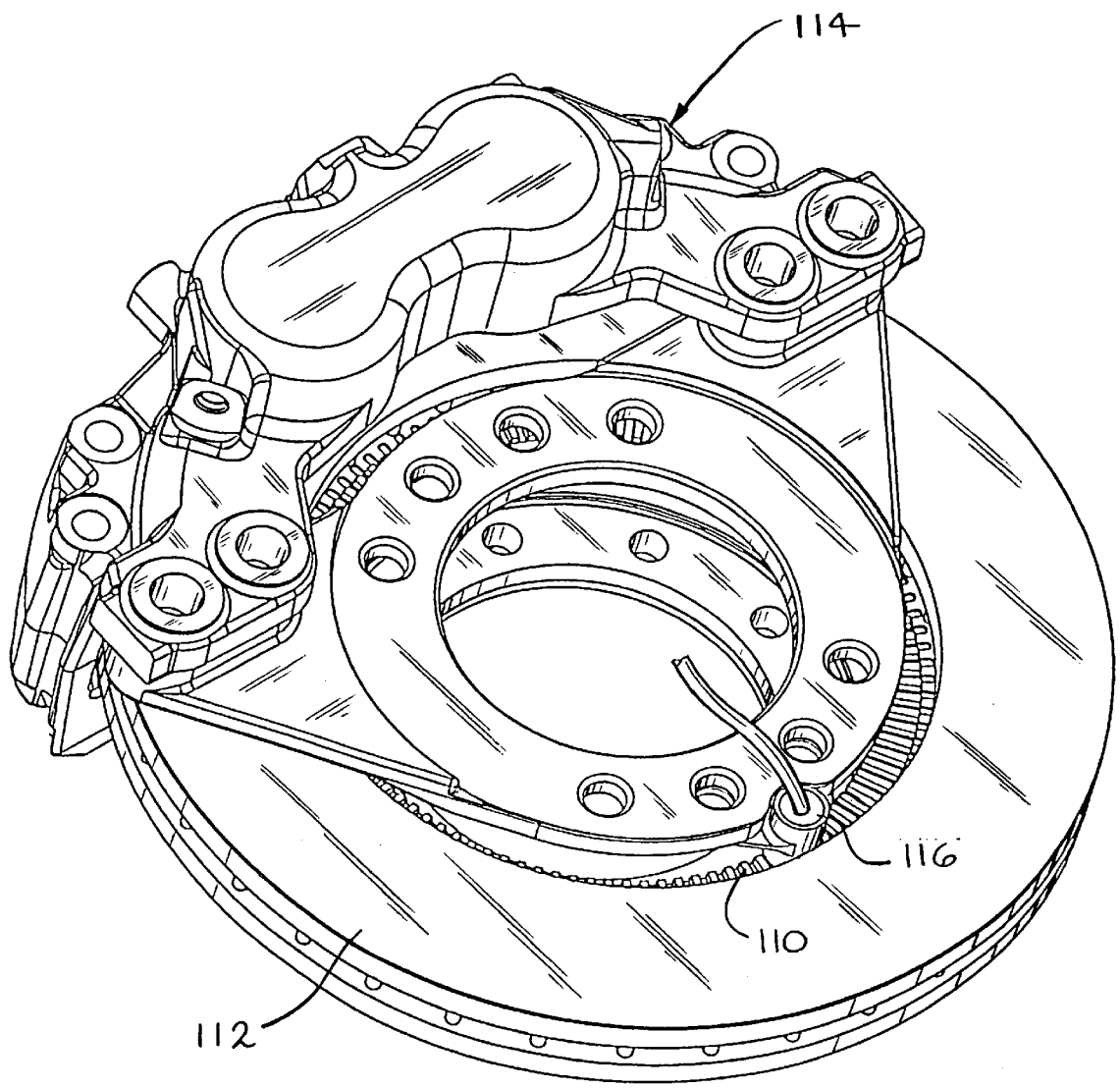
FIG. 12 is a perspective view of a prior art disc brake assembly.

FIGS. 9 and 10 illustrate a second embodiment of a brake drum, indicated generally at 140, in accordance with this invention. As shown therein, the brake drum 140 includes a generally closed end or mounting flange portion 142, a transition section 144, a generally axially extending cylindrical main body 146, and an opened end 148. The cylindrical body portion 146 defines an outer surface 146A and, in the illustrated embodiment, includes a raised continuously extending annular squealer band 150. The mounting flange portion 152 of the brake drum 140 includes a generally centrally located pilot hole 152 formed therein and a plurality of lug bolt holes 154 (six of such lug bolt hole 154 being illustrated) spaced circumferentially around the pilot hole 152. The lug bolt mounting holes 154 are adapted to receive vehicle wheel/wheel hub mounting studs (not shown) for securing a vehicle wheel/wheel hub (not shown) to the brake drum 140 for rotation therewith. The opened end 148 of the brake drum 140 is provided with an annular groove 156.

The brake drum 140 further includes a plurality of teeth 160. The teeth 160 are integrally cast in situ with the casting of the brake drum 140. The teeth 160 are formed at the opened end 148 of the brake drum 140.

Turning now to FIG. 1, there is illustrated a block diagram illustrating the sequence of steps for producing the brake rotor 10, 40 and the brake drum 110, 140 of this invention. Initially, in step 101, a lost foam mold is provided for producing a brake drum/rotor having integral abs teeth in accordance with this invention. Preferably, the mold is formed from aluminum and is precise machined to resemble the desired final product shape. In step 102, the mold is used to make a vaporizable pattern for producing the brake drum/rotor of this invention. The pattern is formed from polystyrene/foam beads and has a configuration that is of the desired final product shape. Next, in step 103, sand is packed around the pattern to form a mold. In step 104, the brake rotor/drum of this invention is produced using the lost foam casting process. In particular, in step 104, molten metal is poured into the mold causing vaporization of the pattern. Following this, in step 105, the brake rotor/drum is removed from the mold. Finally, in step 106, the "as cast" brake rotor/drum is machined to desired tolerances to thereby produce the associated brake rotor/drum shown in FIGS. 1–2, 3–4, 6–7, and 8–9).

One advantage of this invention is that the lost foam process has the ability to make the abs teeth 22, 52, 122, 152 in the associated brake rotor/drum 10, 40, 110, 140 more accurately because the formability of the foam beads and the bonding of the beads are more reliable and near consistently perfect than the prior art sand and core making operations of the prior art sand type casting operation. Also, the foam (polystyrene) of the lost foam core is not subject to the same problems as the prior art sand core. The lost foam core can be inspected before it goes into the sand where the loose sand will not cause destruction of the abs teeth. Prior art sand castings using cores are difficult to inspect before they are closed for the pouring operation. In addition, the lost foam process reduces the occurrence of burnt in sand or broken teeth in the sand because the teeth are preferably coated with a ceramic slurry which when dry, forms a barrier against sand intruding into the tooth material. Thus, the chances of broken teeth are reduced because the foam pattern is resilient, to a degree (as Styrofoam will be), whereas a prior art sand core is relatively rigid and the prior art process can break the "fragile" sand teeth if impacted by the pattern when withdrawn from the mold.

Also, the brake rotor/drum 10, 40, 110, 140 produced according to this invention can provide the means for special abs teeth contours which compensate for the natural material tendencies during the machining process, such as tearing of the material and leaving burrs at the exit of the cut. Thus, this invention optimizes this advantage of the foam capabilities and produces a uniquely shaped abs tooth specifically designed to improve the machining of such a tooth. Further, the brake rotor/brake drum 10, 40, 110, 140 of this invention provides a more consistent set up area for machining so that the abs teeth can be machined to the tight requirements of the abs sensor manufacturers. The abs sensor requires well formed abs teeth to create a good basis for creating a strong abs signal. Thus, this is provided in the brake rotor/brake drum of this invention because the lost foam process greatly reduces the chance of missing abs teeth and the valleys formed between the abs teeth being filled in with material which is a common problem in the prior art green sand type processes. Also, because a reduced draft angle on the abs teeth allows better definition between the associated teeth, the nearly straight teeth of the brake rotor/brake drum of this invention will provide a better chance that a distinguishable signal can be seen by the abs sensor. In addition, the brake rotor/drum of this invention does not use a "float" core which is used in the prior art green sand castings having separate sand cores to locate the abs teeth. Thus, the teeth, the braking surface, and the mounting surface of the brake rotor/drum of this invention can be located more accurately relative to one another. Since the location of the abs teeth is important, the abs teeth of the brake rotor/brake drum of this invention will remain concentric to the braking surface and the mounting surface since no core shift occurs like in the prior art. Also, since no core shift occurs, this invention produces a more balanced brake rotor/drum which is important to a hub or wheel assembly incorporating such a brake rotor/brake drum. Balance is important since an imbalance can cause undesirable vibration which is detrimental to the abs tooth position relative to the abs sensor. Thus, vibration due to imbalance of the brake rotor/drum can cause a false signal to be read by the abs sensor resulting in improper operation of the abs system.

The brake rotor 10, 40 of this invention can be used in connection with a disc brake assembly, such as that illustrated in U.S. Pat. No. 5,660,253 to Rike, the disclosure incorporated herein. The brake drum 110, 140 of this invention can be used in connection with a drum brake assembly, such as that illustrated in U.S. Pat. No. 5,070,968 to Evans, U.S. Pat. No. 5,720,367 to Evans, U.S. Pat. No. 5,180,037 to Evans, the disclosures of which are incorporated herein.

In accordance with the provisions of the patents statues, the principle and mode of operation of this invention have been described and illustrated in its preferred embodiment.

However, it must be understood that the invention may be practiced otherwise than as specifically explained and illustrated without departing from the scope or spirit of the attached claims.

What is claimed is:

1. A method for producing a rotatable vehicle brake component having integrally formed teeth adapted for use with a sensor of an anti-lock brake system comprising the steps of:

(a) providing a vaporizable pattern made from a foam material and having a shape which generally corresponds to the desired final shape of the rotatable vehicle brake component, the rotatable vehicle brake component selected from the group consisting of a vehicle brake drum and a vehicle brake rotor;

(b) forming a mold around the pattern;

(c) forming the rotatable vehicle brake component by a lost foam casting process wherein molten metal is introduced into the mold causing vaporization of the pattern, the rotatable vehicle component having integrally formed teeth;

(d) removing the cast rotatable vehicle brake component from the mold;

(e) machining the integrally formed teeth of the cast rotatable vehicle brake component to predetermined tolerances to thereby produce the rotatable vehicle brake component.

2. The method as set forth in claim 1 wherein step (a) further includes forming the pattern out of foam beads comprised of a polystyrene material.

3. The method as set forth in claim 1 wherein step (b) further includes packing sand around the pattern to form the mold.

4. The method as set forth in claim 1 wherein step (e) further includes machining a centrally located pilot hole in the rotatable vehicle brake component.

5. The method as set forth in claim 4 further including the step of machining a plurality of lug bolt holes about the circumference of the pilot hole for mounting the rotatable vehicle brake component to a vehicle wheel.

* * * * *